Jan. 3, 1956  J. R. FREEZE  2,729,180
SPIRAL PIPE MACHINE
Original Filed Feb. 17, 1948  7 Sheets-Sheet 2
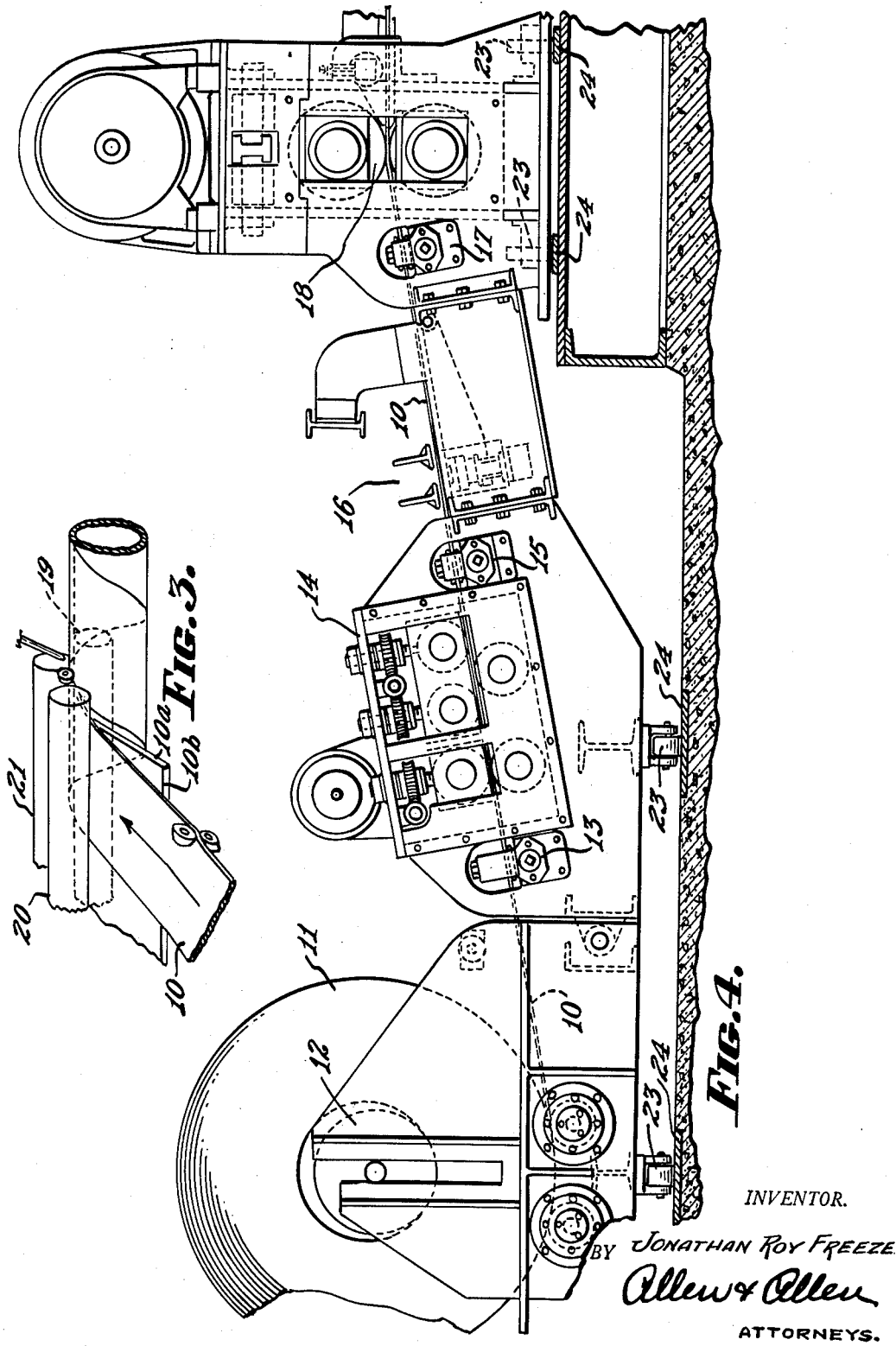
INVENTOR.
JONATHAN ROY FREEZE
BY Allen & Allen
ATTORNEYS.

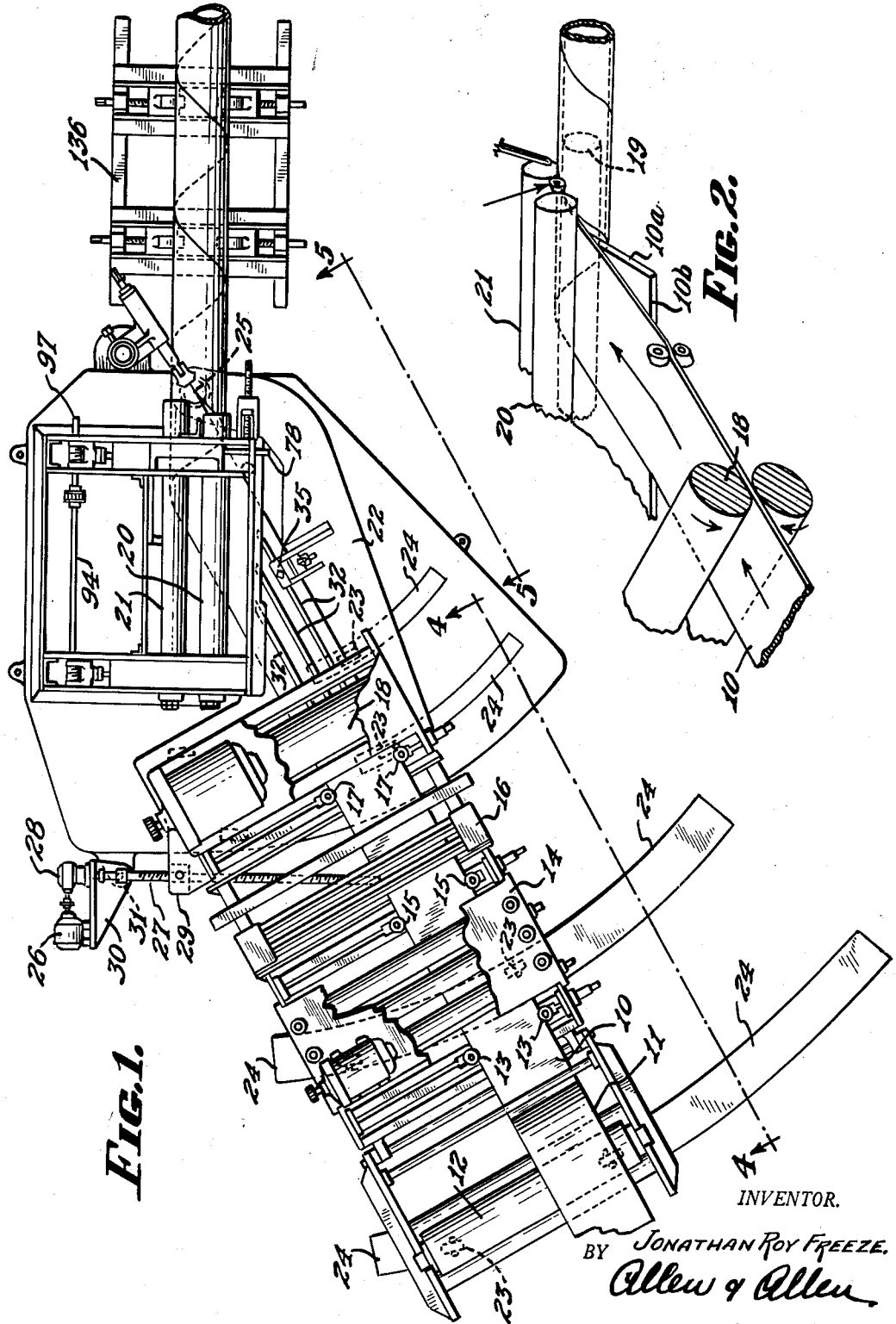

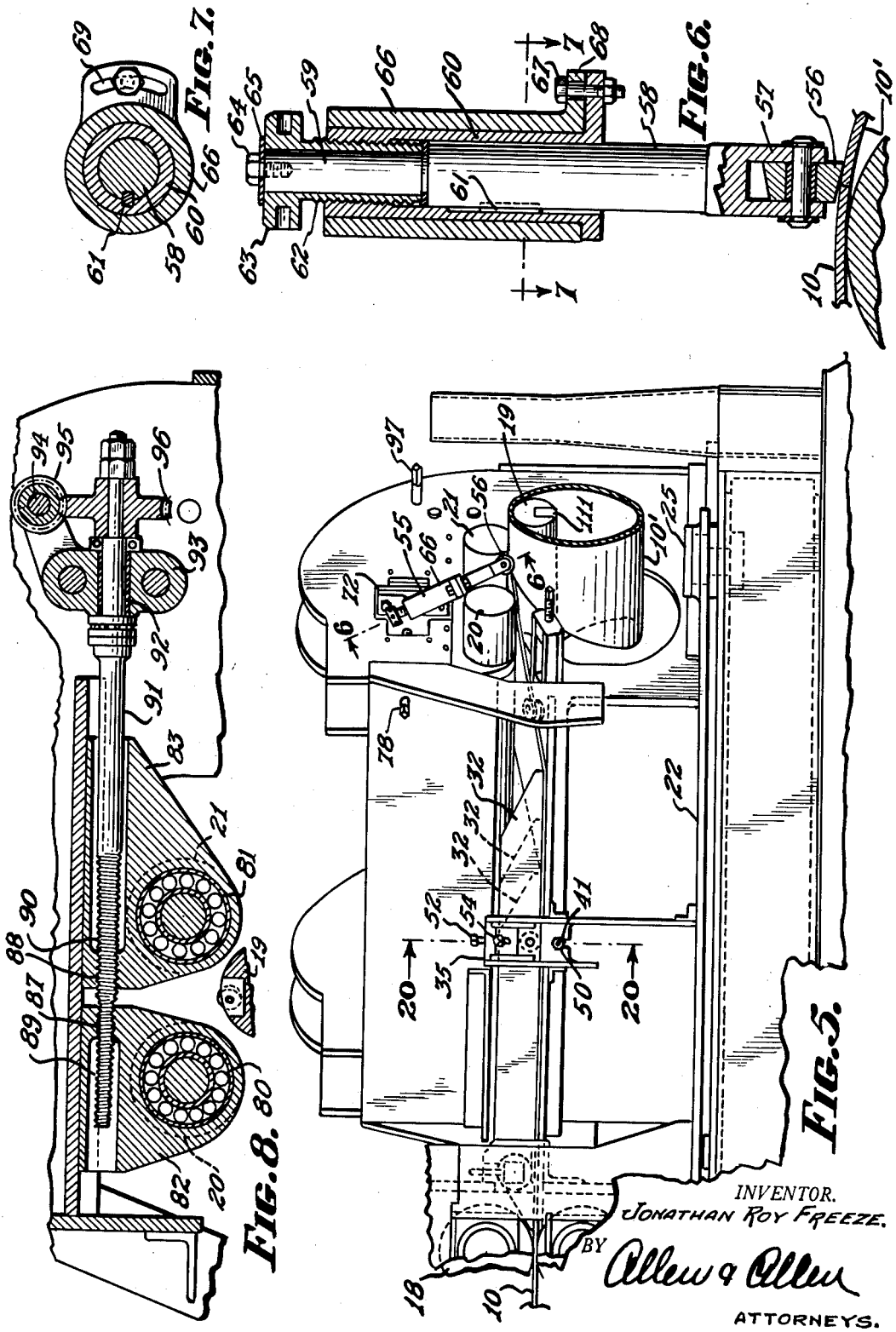

Jan. 3, 1956  J. R. FREEZE  2,729,180
SPIRAL PIPE MACHINE
Original Filed Feb. 17, 1948  7 Sheets-Sheet 4

INVENTOR.
JONATHAN ROY FREEZE.
BY
Allen & Allen
ATTORNEYS.

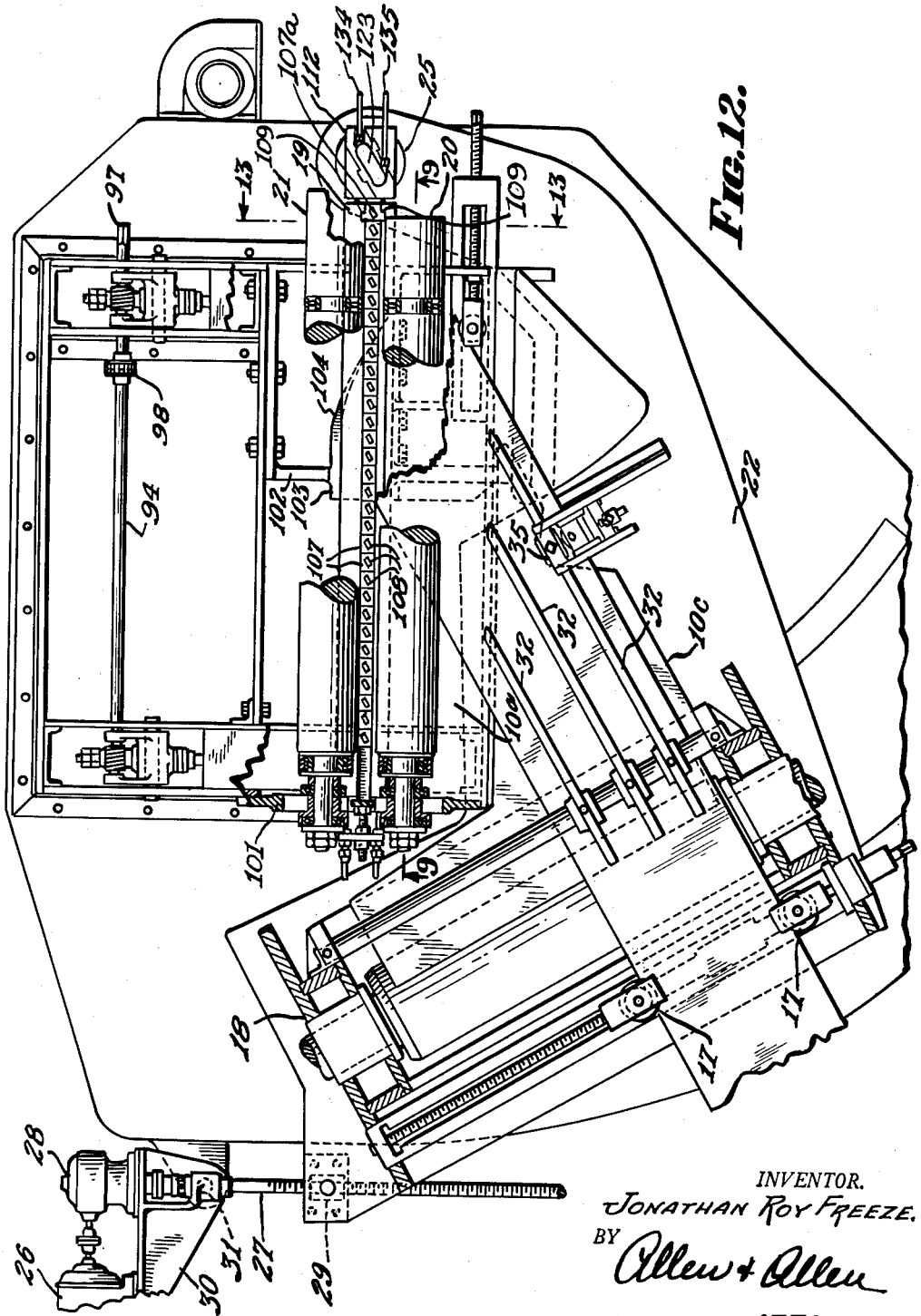

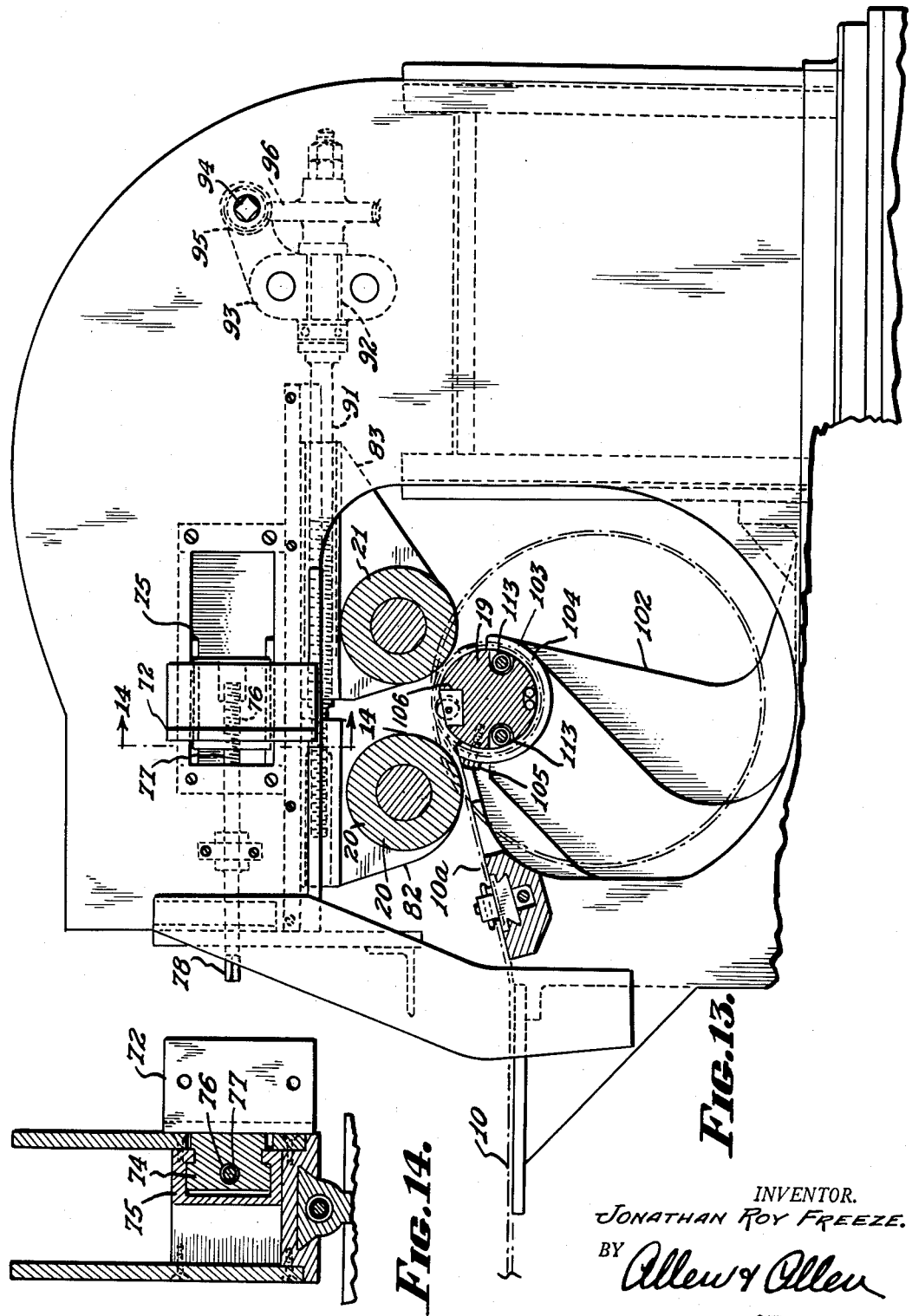

United States Patent Office 2,729,180
Patented Jan. 3, 1956

2,729,180

SPIRAL PIPE MACHINE

Jonathan Roy Freeze, Middletown, Ohio, assignor to Armco Steel Corporation, Middletown, Ohio, a corporation of Ohio Original application February 17, 1948, Serial No. 8,758, now Reissue Patent No. 23,316, dated January 2, 1951, of Patent No. 2,501,845, March 28, 1950. Divided and this application June 28, 1949, Serial No. 101,883

9 Claims. (Cl. 113—35)

This invention relates to a machine and a method for making spiral welded pipe from flat rolled metal, and this application is a division of my copending application Serial No. 8,758, filed February 17, 1948, now Reissue Patent 23,316, dated January 2, 1951, of Patent No. 2,501,845 issued March 28, 1950.

Spiral welded pipe has been made from flat rolled metal for a number of years and such pipe has been more or less commercially successful. For example, pipe has been made commercially for many years in accordance with the teachings of my earlier Patents Nos. 1,793,281 and 1,793,282, dated February 17, 1931, but the manufacture of pipe in accordance with the principles therein set forth has always been attended by a great many difficulties.

Flat rolled metal from which spiral welded pipe is made, and indeed any flat metal piece produced by rolling, is characterized by camber and this camber is not uniform, may not be compensating and is generally unpredictable. When such cambered flat metal is formed into a helix in the absence of special precautions, the pipe which is produced will either not be of uniform diameter, or it will have imperfect welds. Both of these results render the pipe commercially unsalable. Numerous attempts have been made since the date of my earlier patents to avoid the difficulties mentioned above, none of which has been completely satisfactory.

It is therefore one of the objects of my invention to provide a method of making spiral pipe in accordance with which the difficulties arising from camber in the flat rolled metal are compensated to provide for perfect welds, and substantially constant diameter pipe. In this connection it is also an object of my invention to provide a mechanism for controlling the position of the metal edges in the region of the weld for the same purpose.

When flat rolled metal is formed into a helix, the metal being initially flat, the edges of the metal tend to bend outwardly a small amount so that the welded pipe will be characterized by an inverted V-shaped swell along the weld. This makes the welding operation difficult because the weld is difficult to back up and the resulting pipe is unsightly because of this swell. It is therefore another major object of my invention to provide a mechanism for giving to one or both of the edges of the metal a bend in a direction opposite to the resulting bend mentioned above, to counteract the same so as to produce pipe which is smooth on the outside except for a helical bead resulting from the welding operation.

In this connection, it is another object of my invention to provide means whereby the lateral extent of the edge bend may be adjusted, as well as the degree of the bend, so as to produce smooth pipe in all thicknesses and tempers of strip.

In the feeding of pipe stock into the machine according to the present invention, the plane of movement of the stock is changed so that the stock after moving in a substantially horizontal plane, is caused to move up an inclined plane to enter the forming means. In changing the direction of movement of the stock there is danger that a twist may be given to the stock, and it is therefore another object of the invention to provide an arrangement whereby the stock is not twisted in being thrust into the forming means.

Thus, it is an object of my invention to provide a construction where the line of intersection of the planes of movement of the stock is substantially parallel to the axis of the forming means.

It is yet another object of the invention to provide an arrangement as outlined above whereby the helical angle may be changed as required by different widths, and thicknesses of stock, and different diameters of pipe to be produced, while at the same time maintaining the line of intersection of said planes substantially parallel to the axis of the forming means.

In the machine according to the present invention the stock is formed about a bending knee which bending knee is supported at one end and is free at the exit end of the machine. As a result of this cantilever construction the knee is subject to a certain amount of deflection as the stock is formed about it. Deflection of the knee tends to produce a change in the resulting pipe diameter. Thus as stock is continuously formed about the bending knee into a helix, the small amount of deflection in the bending knee will cause an increase in pipe diameter. It is therefore another object of the invention to provide means for compensating for the deflection of the bending knee. In this connection it is an object of the invention to provide for different thicknesses and pipe diameters by means of the heel and buttress rolls rather than by adjustment of the bending knee.

It is another object of the invention to provide means for throwing the heel and buttress rolls out of parallelism so that these rolls toe in toward the exit end of the machine. Thus it is an object of the invention to fully bend the stock as it passes over the unsupported part of the knee, thereby maintaining a substantially constant pipe diameter despite the said deflection. The foregoing and other objects of the invention which will be discussed in more detail hereinafter, or which will be apparent to one skilled in the art upon reading these specifications, are accomplished by that certain construction and arrangement of parts and by that series of method steps of which the following are exemplary embodiments. Reference is made to the drawings forming a part hereof, and in which:

Figure 1 is a general plan view of the machine with certain parts broken away and other parts removed for clearer understanding.

Figure 2 is a fragmentary diagrammatic view in perspective showing the forming of the stock into a helix.

Figure 3 is a view similar to Figure 2, but showing the production of larger pipe.

Figure 4 is an enlarged side elevation partly in section taken on line 4—4 of Figure 1.

Figure 5 is an enlarged fragmentary elevational view taken on the line 5—5 of Figure 1.

Figure 6 is an enlarged detailed sectional view taken on the line 6—6 of Figure 5.

Figure 7 is a cross sectional view taken on line 7—7 of Figure 6.

Figure 8 is an enlarged detailed sectional view taken on line 8—8 of Figure 9.

Figure 12 is an enlarged fragmentary plan view of the machine with parts broken away and other parts removed for clearer understanding.

Figure 13 is an enlarged sectional view taken on line 13—13 of Figure 12.

Figure 14 is a sectional view taken on the line 14—14 of Figure 13.

Figure 9:
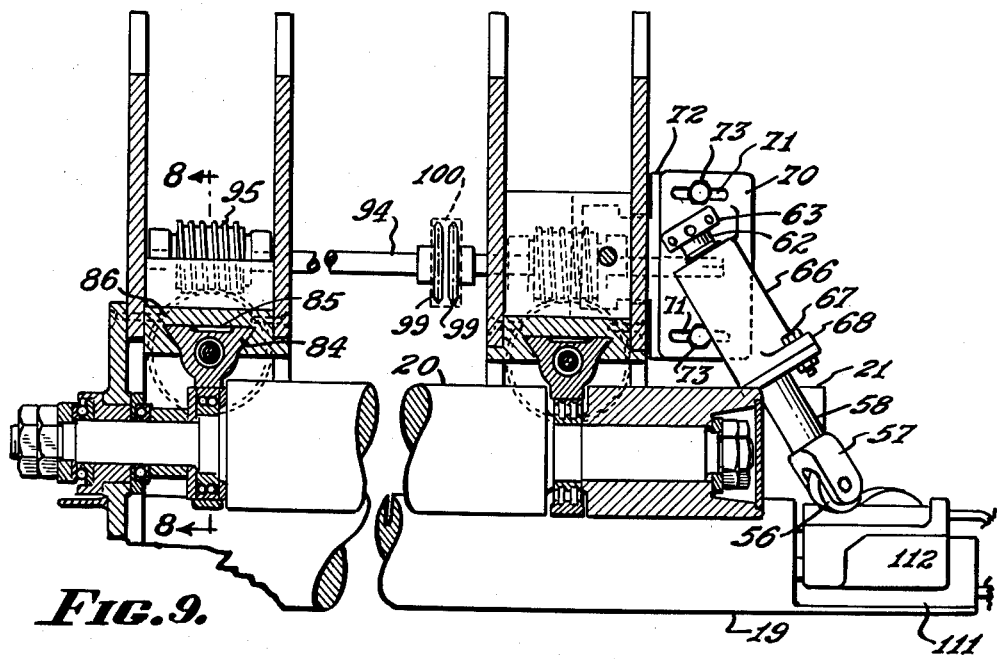
Figure 9 is a detailed sectional view taken on line 9—9 of Figure 12.
Figure 10:
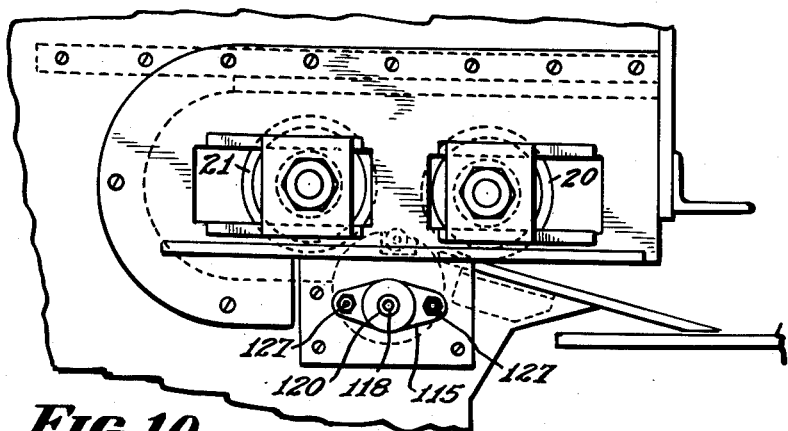
Figure 10 is an end elevation as seen from the left end of Figure 9.
Figure 11:
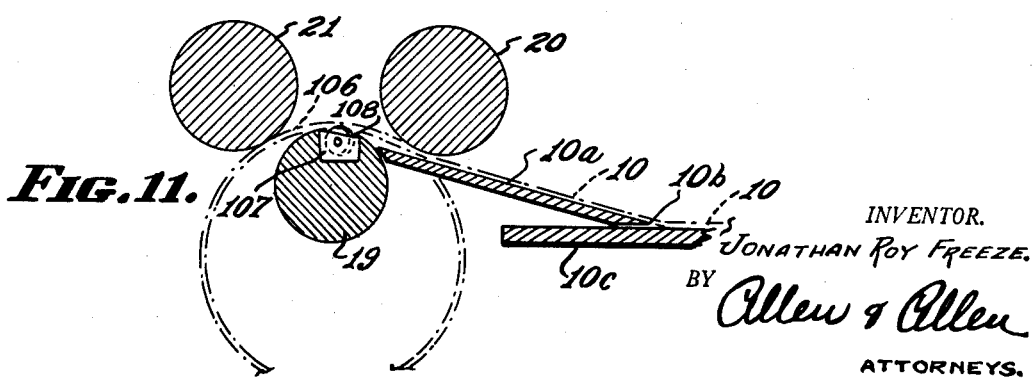
Figure 11 is a diagrammatic view showing the arrangement of the heel and buttress rolls, the bending knee and the inclined plate and table.

Throughout these specifications I have used the word stock to designate the flat rolled metal which is formed into a helix and welded to produce the finished pipe.

The general layout of the machine is perhaps best seen in Figure 1. The metal stock 10 is uncoiled from a coil 11, on the reel 12, and passes between edge guide rollers 13, through a roller leveler indicated generally at 14. It then passes between another pair of edge guiding rollers 15, to the welding station indicated generally at 16. At the welding station 16, the ends of the succeeding coils are butt welded together so that pipe can be formed continuously.

Passing between another pair of edge guide rollers 17 the stock passes through the driving roll unit indicated generally at 18. It is the unit 18 which thrusts the stock into the forming mechanism where it is formed into a helix. The portion of the machine described thus far is seen in side elevation in Figure 4.

When the stock issues from the driving unit 18 it is moving in a substantially horizontal plane and in order to enter the forming mechanism it must ride up an inclined plane as indicated at 10a in Figures 2 and 13. The forming means comprises essentially a fixed bending knee indicated generally at 19 and the heel roller 20 and buttress roller 21. The stock passes over the knee 19 and under the rolls 20 and 21. Since the stock enters the forming mechanism at an angle, the forming means bends the stock to form it into a helix, and as a convolution is formed its rear edge comes to a position adjacent the forward edge of the entering stock, and substantially at this point the weld is made. The portion of the machine including the coil reel, leveler, welding station and driving rolls, is mounted on a frame indicated generally at 22, which frame is provided with casters 23 riding on the curved rails 24, and the entire unit and the frame 22 is swung about the pivot point 25 to produce the desired helical angle. This is accomplished by means of a motor 26 driving the screw 27 through the gear reducer 28. The screw 27 engages to a nut 29 which is a part of the swingable frame. The motor, gear reducer and screw are mounted upon a bracket 30 which is pivoted at 31, and it will be clear that the motor 26 in turning will cause the feed unit to be moved in an arcuate path about the pivot point 25.

Figure 16:
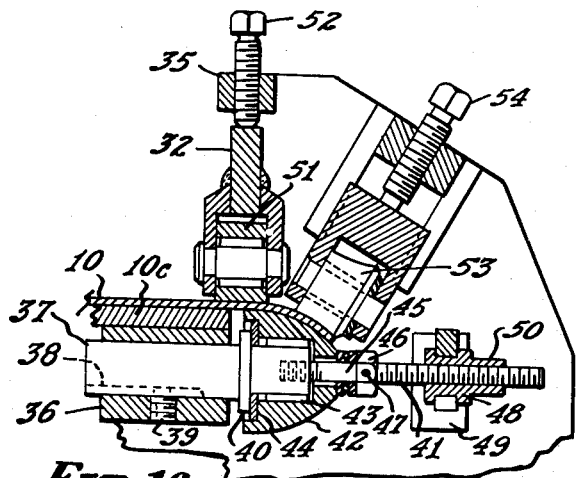
Figure 16 is a sectional view on line 16—16 of Figure 15.
Figure 15:
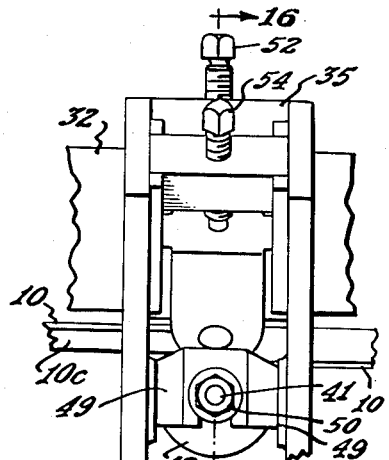
Figure 15 is an enlarged fragmentary side elevation of the edge bending mechanism.

Having thus described in a more or less general way the machine as a whole, certain individual features thereof will now be described in more detail. As was pointed out above, the stock in passing from the driving rolls 18 to the forming mechanism, moves over the inclined plate 10a. The bite between the heel roll 20 and the bending knee 19 is not parallel to the bite between rolls 18. Both of these bites are, however, in horizontal planes, so that normally the stock between the rolls 18 and the forming mechanism would have to be twisted. The difficulty is avoided as follows: the inclined plate 10a is secured in relation to the bending knee 19 and its lower edge 10b is paralled to the axis of the bending knee. It overlies the horizontal plate or table 10c over which the strip is fed from the driving mechanism 18. The stock thus passes over two plane surfaces 10a and 10c, which are disposed at an angle to each other with the line of intersection of said planes (as exemplified by the line 10b) being parallel to the axis of the forming mechanism. In order to confine the stock and to cause the bend in the stock to occur substantially along the line 10b, a number of hold-downs 32 are provided as best seen in Figures 1, 5 and 16. These hold-downs are of varying length so that their ends lie substantially on the line 10b. By these means the stock is caused to be bent along a line substantially parallel to the axis of the forming mechanism so that the forming operation is accomplished without twisting. This feature is perhaps best seen from a consideration of Figures 2 and 3.

Figure 21:
Figure 21 is a transverse cross-sectional view of the stock showing the edges bent.
Figure 22:
Figure 22 is a longitudinal cross-sectional view through the upper convolutions of a pipe showing the condition achieved when edge bending is omitted.
Figure 23:
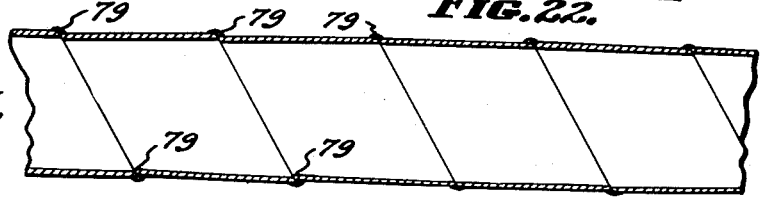
Figure 23 is a typical longitudinal sectional view through a pipe according to the invention.

When stock which is initially flat transversely of its length is formed into a helix it is characteristic that the edges of the stock will turn up a small amount in an upward direction so that the welded pipe will be characterized by an upstanding swell following along the seam. This condition is clearly shown at 33 in Figure 22. It has been found that this objection can be eliminated if the stock before it enters the forming rolls has its edges deformed in an opposite direction as indicated at 34 in Figure 21. When stock configured as in Figure 21 is formed into a helix, the tendency discussed above removes the prebending indicated at 34 and results in a truly cylindrical pipe such as shown in Figure 23.

In small machines it will generally be only necessary to counterbend one edge of the stock. With large machines and with thick stock it is preferable to counterbend both edges of the stock. In the drawings the counterbending mechanism has been shown for one edge of the stock only, but it will be clear that if required by the thickness of the stock it could be reproduced on the other edge as well. In Figure 1 the edge counterbending mechanism is generally indicated at 35. This mechanism is shown in more detail in Figure 16 where the stock is again indicated at 10 as it passes over the plate 10c. Secured to the underside of the plate 10c is a bearing 36 for the roller shaft 37. The shaft 37 may be provided with a keyway at 38 and be held against rotation by a key 39, so that the shaft 37 is held against rotation but may be moved axially. The shaft 37 has a shoulder 40 and has secured to its end a screw 41. A bullet shaped roller 42 bears on the shaft 38 through the needle bearing 43 and is held against axial movement by the thrust bearing 44, on the inside, and a thrust bearing 45 on the outside. The parts are held in assembled relation by the nut 46, which may be pinned as at 47 when the desired adjustment is achieved. A nut 48 is rotatably mounted in the frame element 49 and is provided with a head 50 for use with a wrench. The nut 48 engages the screw 41 so that upon rotation thereof the bullet shaped roller 42 may be moved axially toward left or right, as seen in Figure 16. The base, or widest portion, of the roller 42 is substantially coplanar with the upper surface of the plate 10c.

The stock 10 is caused to conform to the roller 42 by two rollers bearing on the stock from above. The roller 51 is a cylindrical roller mounted as shown for adjustment by means of the screw 52, and the roller 51 is positioned to bear on the stock above the edge of plate 10c and the edge of the bullet shaped roller 42. A curved roller 53 having a concave transverse face corresponding to the convexity of the bullet shaped roller 42, is mounted for adjustment in an angular direction by means of the screw 54. The roller 53 is arranged to bear against the stock edge in the region of the small end of the roller 42. The two rollers 51 and 53 together insure that the stock conforms closely to the curve of the bullet shaped roller 42.

For different thicknesses of stock and other different conditions of temper or springiness, a different amount and degree of edge bending may be called for. With the construction shown in Figure 16 adjustment of the roller 42 toward the left or right in Figure 16 will vary the amount of the edge which is bent and the degree to which it is bent. The roller 53 is simply adjusted in accordance with the position of the roller 42, and in accordance with the thickness of the stock being handled. The roller 51 need only be adjusted for different thicknesses. The foregoing subject matter having to do with the edge bending mechanism is claimed in my copending application Serial No. 225,716, filed May 11, 1951.

Figure 24:
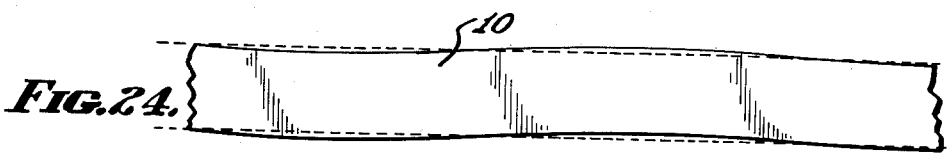
Figure 24 is a plan view of a section of stock illustrating camber.

Flat rolled metal stock such as is used in the manufacture of spiral welded pipe is generally characterized by camber. This condition is illustrated in Figure 24 in which the solid lines represent the actual stock edges. It is this condition shown in Figure 24 which is generally known as camber. One of the great difficulties heretofore had in the manufacture of spiral welded pipe has been occasioned by camber in the stock, which camber is not uniform and which may or may not be cumulative. In the manufacture of spiral welded pipe from stock thus characterized by camber, one or both of two possible defects will appear in the final pipe. Either the pipe will be characterized by imperfect welds, or the pipe will be of non-uniform diameter, or both.

According to the present invention the difficulties which arise by reason of camber in the stock are overcome by means of what will be referred to hereinafter as a vernier control. This vernier control is best seen in Figures 5 and 6, and is generally indicated at 55.

Referring first to Figure 6, a roller 56 is journaled as shown in a fork 57, on the end of the ram 58. The ram 58 has a portion of reduced diameter 59 and is mounted for slidable movement axially in a sleeve 60. It is held against rotation in the sleeve 60 by means of a key 61 riding in a keyway in the portion 58. The portion 59 is surrounded by a threaded sleeve 62, provided with a turret head 63 which is secured to the portion 59 by means of a bolt 64 threaded into the end of the portion 59 and bearing against a washer 65 extending partially over the turret head 63. The threads of the sleeve 62 engage external threads in the upper portion of the sleeve 60, and it will be clear from the foregoing description that as the turret head 63 is turned the ram 58 with its roller 56, is moved up and down axially of the ram, as seen in Figure 6.

The sleeve 60 fits into a sleeve 66 and the flanges of the sleeves 60 and 66 are secured together by means of the nut and bolt indicated generally at 67, passing through perforations in the flanges. The flange 68 and the sleeve 66 are provided with an arcuate slot 69 best seen in Figure 7, so that the sleeve 60 together with the ram 58 and roller 56 may be adjusted about the axis of the ram 58. This adjustment is made to cause the axis of the roller 56 to be normal to the mating edges of the strip.

The sleeve 66 in which the parts above described are mounted, in integral with a plate 70 (Figure 9) which is provided with the slots 71. The plate 70 is bolted to a plate 72 by means of the bolts 73. By virtue of the slots 71 the position of the plate 70 with respect to the plate 72 may be adjusted in a direction parallel to the axis of the forming device. The plate 73 (see Figures 13 and 14) has a portion 74 riding in ways 75 and has a threaded hole 76 for the screw 77. Thus, by rotating the screw 77 the portion 74, together with the plate 72 and all the heretofore described parts carried by said plate, may be moved to the left or right of Figure 13 to adjust the position of the roller in a direction normal to the axis of the forming mechanism. This last adjustment is effected by the application of a suitable wrench, or the like, to the squared end 78 of the screw.

There are thus four adjustments for the roller 56:

(a) The entire mounting may be moved back and forth on a line normal to the axis of the forming means, by screw 77.

(b) The entire mechanism may be adjusted back and forth on a line parallel to the axis of the forming mechanism, by slots 71 and bolts 73.

(c) The angular position of the roller axis may be adjusted by slot 69 and bolt 67, and (d) The roller may be adjusted in and out substantially radially of the pipe being formed by turret head 63.

In practice the first three of the above named adjustments are made on the basis of the helical angle being used and the diameter of the pipe being formed. The last adjustment by means of the turret nut 63 is made during the forming operation by the operator.

Figure 17:
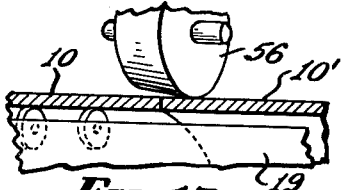
Figure 17 is a diagrammatic sectional view through the upper convolutions of a pipe, axially thereof, showing the vernier control.
Figure 18:
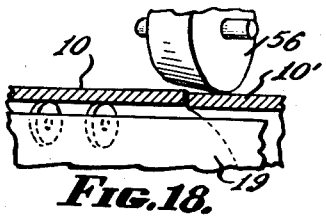
Figure 18 and Figure 19 are similar to Figure 17 but showing different conditions.
Figure 19:
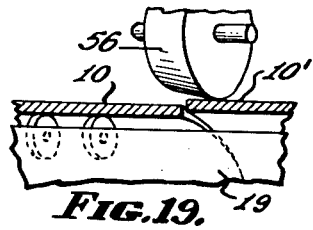

Referring now to Figures 17 to 19 inclusive, there is shown a roller 56 in relation to the meeting stock edges just prior to the welding station. The ingoing stock is again shown at 10 and the first convolution of the stock after passing around the bending knee is indicated at 10'.

In the forming of the stock into a helix the incidence of camber in the strip will cause the adjacent edges of the stock at 10 and 10' to move apart or crowd together and the roller 56 is used to compensate for camber in the following manner:

In Figure 18 let it be assumed that the edges of the stock at 10 and 10' have begun to get too close together. The operator will operate the turret nut 63 to cause the roller 56 to bear down against the loop portion 10' to depress it slightly below the entering portion 10. This condition is exemplified in Figure 18. This tends to make the pipe diameter smaller and the operator can tell by inspection when the edges of the stock portions at 10 and 10' are again correctly spaced. The normal condition, of course, is shown in Figure 17 where the portions 10 and 10' are lined up directly edge to edge with neither side being depressed below the other.

If it be assumed that the edges of the stock at 10 and 10' are gradually becoming separated, the operator will adjust the turret screw 63 to raise the roller 56 so as to permit the loop portion 10' to rise slightly above the entering stock at 10. The operator continues to watch the relationship between the parts 10 and 10' until a proper spacing of the edges is re-established and then readjusts the positions of the roller 56 to normal. Thus the operator by simply watching the formation of the seam and controlling the position of the roller 56 can insure the formation of a perfect, continuous, weld and the maintenance of substantially constant diameter in the finished pipe.

The formed pipe as shown in Figure 23 will here and there be characterized by very slightly stepped configurations as indicated at 79. The condition is considerably exaggerated in Figure 23 and actually the pipe diameter is substantially constant. The slight variations indicated at 79 compensate for the camber in the strip and prevent the pipe diameter from changing substantially in one direction or the other.

Figure 20:
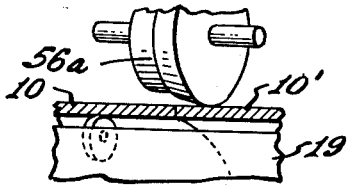
Figure 20 is similar to Figures 17 and 19 but shows a modification.

While the roller 56 has been shown as being slightly tapered and bearing primarily upon the loop portion 10, a similar result may be obtained by means of a stepped roller as indicated at 56a in Figure 20. The seam can be controlled by a roller bearing against the entering stock at 10 and in its broadest aspect this invention includes such a structure; but it has been found that the loop portion 10' which is free more or less so that it can be depressed below the entering portion 10 and so that it can spring up thereabove, is more susceptible to control than the entering stock portion and Figures 17 to 20 are illustrative of the preferred way of controlling the seam. The last described subject matter having to do with vernier control is claimed in my copending application Serial No. 225,716, filed May 11, 1951.

The adjustment of the heel and buttress roll to compensate for deflection in the bending knee will next be described:

The heel roll 20 and the buttress roll 21 are mounted in bearing 80 and 81 respectively in the castings 82 and 83. These are shown most clearly in Figure 8 and it will be understood that the construction now to be described is reflected at the other end of the rolls 20 and 21. The castings 82 and 83 are formed with the dovetail configuration best seen at 84 and 85 in Figure 9. Dovetails 84 ride in guideways 85 in the frame member 86. The castings 82 and 83 are oppositely threaded as at 87 and 88 and the threated portions 87 and 88 cooperate with the opposite screws 89 and 90. The screws 89 and 90 are formed upon the shaft 91 and are, of course, of opposite hand. Furthermore, the screw 90 has a larger pitch than the screw 89.

From the foregoing it will be clear that upon rotation of the shaft 91 the rolls 20 and 21 will be caused to approach each other or move apart, and that the movement of the roll 21 will be faster than the movement of the roll 20, because of the increased pitch of the screw 90. The shaft 91 has a bearing at 92 in a bracket 93 which also provides a bearing for the shaft 94 which carries the worms 95. The worms 95 mesh with a worm wheel 96 secured to the shaft 91. The shaft 94 terminates in a squared end at 97 for use with a wrench or other suitable operating device. Thus upon rotation of the shaft 94 by engagement of its squared end 97 with a suitable tool, the bearings for the rolls 20 and 21 at both ends are concurrently caused to move together or to move apart with the buttress roll 21 moving at a greater rate than the heel roll 20.

In Figures 9 and 12 there will be seen a coupling indicated generally at 98 in the shaft 94. As best seen in Figure 9, the shaft 94 is actually interrupted and the adjacent ends of the shaft are each provided with sprocket 99. A sprocket chain passes around the two sprockets 99 to lock them together.

In order to compensate for the deflection of the bending knee it is necessary to adjust the heel and buttress rolls 20 and 21 out of parallelism so as to bring said rolls closer together at the delivery end than at the entrance end. This is easily accomplished by removing the sprocket chain (indicated at 100 in broken lines in Figure 9) and adjusting the roll bearings at the delivery end of the machine to bring them closer together without affecting the adjustment at the entering end. When the desired amount of non-parallelism is obtained the chain 100 is replaced and the two portions of the shaft 94 are again coupled together.

In its broadest aspects the invention involves the compensation for the deflection of the bending knee, and the adjustment of the heel and buttress rolls described above is the preferred way of accomplishing this compensation. Similar effects may be obtained if the heel and buttress rolls are not adjustable out of parallelism with each other, but the two of them together are adjustable out of parallelism with the axis of the bending knee. In other words, the heel and buttress rolls together may be adjusted downward slightly at the exit end of the machine to substantially the same amount as the bending knee is deflected downward. Conversely, the bending knee support may be tilted up for the same purpose.

Similar results are obtainable if the buttress roll is slightly frusto-conical in configuration with its base disposed at the exit end of the machine. Such a cone frustum would be only slightly off a true cylinder because the deflection in the bending knee is relatively small. The deflection, however, is great enough to cause a cumulative variation in pipe diameter if steps are not taken to compensate for it.

In all machines of this nature of which I am aware, adjustment for different thicknesses and pipe diameters has been accomplished by adjustment of the bending knee with the heel and buttress rolls remaining fixed. By making the heel and buttress rolls adjustable, thicknesses and diameters can be changed without the necessity of replacing or adjusting the bending knee. Furthermore, a bigger moment arm is achieved which is a great advantage in connection with thick stock. Generally speaking the larger the diameter and the thicker the stock the wider apart the heel and buttress rolls will be spaced. The amount of spacing necessary will, of course, be modified by conditions of spring and workability of the stock.

The construction of the bending knee will now be described:

Generally speaking the bending knee 19 is a cylindrical member which at one end is supported by and welded to a side frame member as at 101. Adjacent its other end (the delivery end) the knee is supported as best seen in Figure 12 by means of a bracket 102 having a semi-cylindrical cradle 103 which has a helical edge 104. The knee is secured to the cradle by means of bolts 105 as best seen in Figure 13. The helical edge 104 is, of course, provided to permit the strip to be coiled about the bending knee.

Longitudinally of the knee at the top there is a slot 106 in which are seated a series of blocks 107 each carrying a small roller 108. All the blocks 107 are identical except the one at the right hand end as seen in Figure 12, and this block 107a is provided with the lateral projections 109 which fit in lateral notches in the slot 106, so as to fix the block 107a against movement in the slot. It will be understood that a series of blocks 107 and 107a are provided for each helical angle at which the entering stock is to be fed. When it is desired to change helical angles the entire set of blocks 107 and 107a is removed and another set having rolls at the appropriate angle is inserted. The rollers 108 support the entering stock as it passes over the bending knee.

The bending knee at its exit end has a portion of reduced size as indicated at 111, which serves as a support for the saddle of the backing shoe indicated generally at 112. The backing shoe and its associated mechanisms are fully disclosed and are claimed in my said patent.

The completed and welded pipe passes out through an exit guide arrangement indicated generally at 136 in Figure 1. The primary purpose of this device is to fix the exit direction of the pipe to facilitate subsequent handling. In connection with the device 136 the usual cut-off device may be provided if desired.

The machine is operated as follows: the frame 22 on which frame are mounted the coil reel 12, the guide rollers 13, 15 and 17, the roller leveler 14, the welding station 16, and the driving roll unit 18, is moved on the tracks 24 about the pivot 25 by the motor 26, until a predetermined angle between the plate 10c of the frame 22 and the plate 10a of the forming means 19, 20 and 21, is reached. This angle depends on the size of the metal stock being processed and the size of pipe desired. The hold-downs 32 are adjusted so that their free ends lie along the line of intersection 10b of the plates 10c and 10a. Depending on the thickness of stock and the other conditions of temper or springiness, the counterbending mechanism 35 is set. The vernier control 55 is, according to the helical angle being used and the diameter of the pipe to be formed, adjusted on a line normal to the axis of the forming means 19, 20 and 21, and also on a line parallel to this axis. The angular position of the axis of the roller 56 is also set.

The heel roll 20 and the buttress roll 21 are adjusted both with respect to each other, i. e., they are toed in at the delivery end depending on the amount of anticipated deflection of the knee 19, and also with respect to the knee 19, i. e. they are moved towards or away from the knee. A series of helical blocks 107 and 107a is selected according to the helical angle at which the entering stock is to be fed and is placed in the slot 106 of the knee 19. The saddle 112 carrying the backing shoe 123 is then properly positioned by movement of the turret head 102, and the backing shoe by adjustment of the slides 128a.

Metal stock is then continuously fed into the machine set-up as above described. The operator will adjust the roller 56 of the vernier arrangement 55 by moving it in and out substantially radially of the pipe being formed according to the amount the pipe development is affected by camber in the metal stock. By this arrangement of parts spiral welded pipe of high quality may be continuously produced.

The actual welding head and its associated mechanisms are not described in detail as they form no part of the present invention.

While certain aspects of the invention have been described in considerable detail, this has been primarily by way of illustration. Many modifications may be made in details of construction without departing from the spirit of the invention.

Having now fully described the invention, what I claim as new and desire to secure by Letters Patent is:

1. In a machine for making spiral welded pipe from metal stock, having rolls for feeding said stock forwardly and bending means to form said stock into a helix, both said means having their axes in horizontal planes, said bending means being stationary and disposed at an oblique angle to said feeding means, said feeding means being movable to change said angle, a feeding table over which said stock is fed, said feeding table comprising two plane portions disposed at an angle to each other, in overlapping relation, one stationary with said bending means and one movable with said feeding means, the line of intersection of said planes being parallel to the axis of said bending means.

2. The structure of claim 1, in which hold-down means are provided for one of said planes, said hold-down means being of graduated length and terminating adjacent said line of intersection to cause said stock to follow said two plane portions.

3. The structure of claim 1, in which the plane portion adjacent said bending means is fixed at an angle to the horizontal and terminates substantially at the line of intersection of said planes, and the other said plane portion is secured to said feeding means and extends beyond said line of intersection beneath said first mentioned plane portion, the angular relation between said feeding means and bending means being adjustable, and said second mentioned plane portion being of sufficient extent to underlie said first mentioned plane portion in all positions of adjustment of said angular relation.

4. In a machine for making spiral welded pipe from metal stock and having a bending knee free of support at one end about which said stock is bent into a helix, said knee because of said freedom of support at one end being subject to deflection, and a heel roll and a buttress roll to cause said strip to bend, bearings for the ends of said rolls, said bearings being slidably mounted in ways for movement toward and away from each other, and screw means for concurrently moving said bearings at both ends toward and away from each other in a common plane, said screw means for one of said rolls being of different pitch than the screw means for the other of said rolls, whereby said rolls are moved at different speeds.

5. A machine according to claim 4 in which the means for moving said bearings comprise, at each end, a shaft having oppositely threaded portions, said portions engaging in oppositely threaded nuts in said bearings.

6. A machine according to claim 5 in which an operative connection is provided between said shafts whereby both ends of said heel and buttress rolls may be adjusted simultaneously.

7. A machine according to claim 6, in which said operative connection is severable, whereby said heel and buttress rolls may be set to a desired degree of nonparallelism, whereupon, when said connection is reestablished, said rolls may be adjusted in relation to each other while maintaining said non-parallel relation.

8. A machine according to claim 7, in which the pitch of the threaded portions operating said buttress roll is greater than that of the portions operating said heel roll.

9. A machine according to claim 8, in which the pitch of the threaded portions operating said buttress roll is double the pitch of the portions operating said heel roll.

References Cited in the file of this patent

UNITED STATES PATENTS

| Number | Name | Date |
|---|---|---|
| 64,351 | Niman | Aug. 30, 1867 |
| 828,732 | Frankenberg | Aug. 14, 1906 |
| 849,858 | Schwarz | Apr. 9, 1907 |
| 1,415,408 | Scott | May 9, 1922 |
| 1,659,754 | Thorsby | Feb. 21, 1928 |
| 1,753,829 | Himmel | Apr. 8, 1930 |
| 1,788,220 | Williams | Jan. 6, 1931 |
| 1,793,281 | Freeze | Feb. 17, 1931 |
| 1,884,658 | Gladkov et al. | Oct. 25, 1932 |
| 2,038,305 | Mikaelson | Apr. 21, 1936 |
| 2,155,859 | Harford | Apr. 25, 1939 |
| 2,158,796 | Harrah | May 16, 1939 |
| 2,410,603 | Dubosclard | Nov. 5, 1946 |